E. D. & O. B. Reynolds.
Cultivator.
No. 3,490. Reissued Jan. 8. 1869.
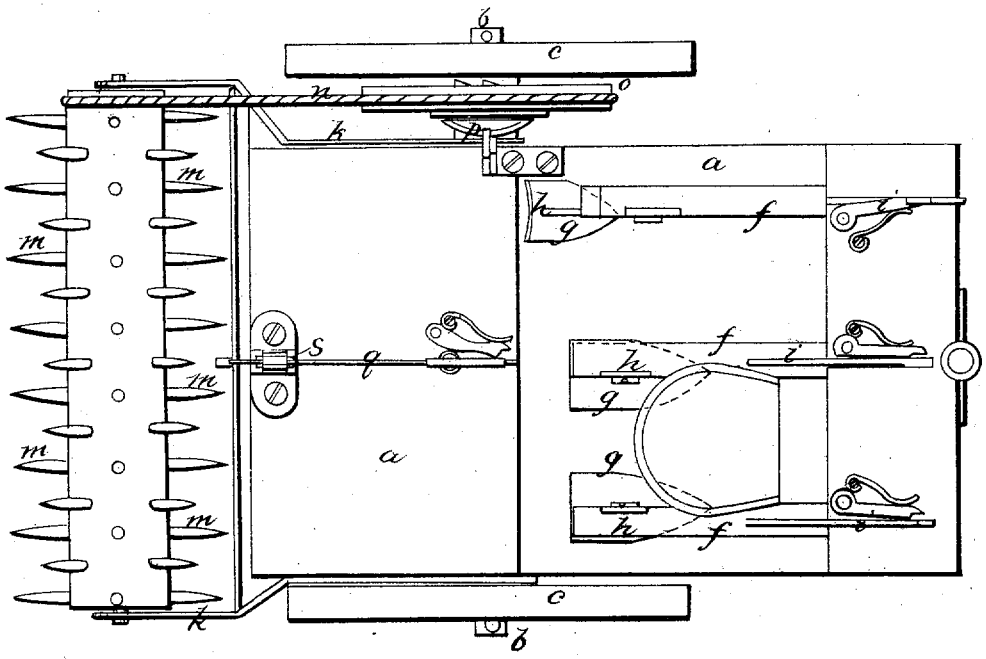
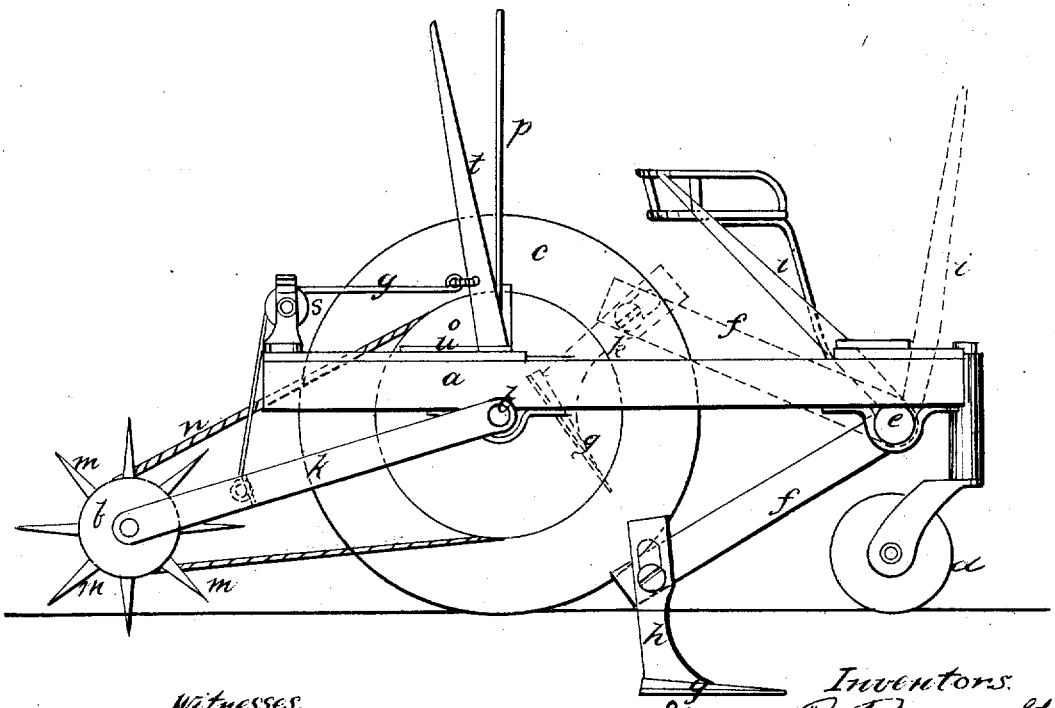
Witnesses.
L. H. Latimer
C. Warren Brown
Inventors.
E. D. & O. B. Reynolds
by their Atty.
Crosby & Walter & Pauld
N. PETERS, PHOTO-LITHOGRAPHER, WASHINGTON, D. C.

UNITED STATES PATENT OFFICE.

EDMUND D. REYNOLDS AND O. BRADFORD REYNOLDS, OF NORTH BRIDGEWATER, MASSACHUSETTS.

IMPROVEMENT IN COMBINED CULTIVATOR AND HARROW.

Specification forming part of Letters Patent No. 46,025, dated January 24, 1865; Reissue No. 3,490, dated June 8, 1869.

*To all whom it may concern:*

Be it known that we, EDMUND D. REYNOLDS and O. BRADFORD REYNOLDS, of North Bridgewater, in the county of Plymouth and State of Massachusetts, have invented an Improved Tilling-Machine; and we do hereby declare that the following, taken in connection with the drawings which accompany and form part of this specification, is a description of our invention sufficient to enable those skilled in the art to practice it.

This invention relates to the construction or organization of wheel-cultivators or machines for tilling, pulverizing, or breaking up the soil; and the improvement consists, primarily, in the arrangement of a share or series of shares in such manner that each share may swing vertically, and is self-adjusting as to depth of penetration, said depth of penetration being in accordance with the angle at which the share is set and the depth to which it must penetrate to bring its bottom surface into a horizontal plane; also, in combining with the vertically-swinging shares a rotary harrow, hung so as to swing vertically, said harrow being placed in rear of the shares, and being driven by the wheel or wheels of the carriage.

Figure 1 of the drawings represents a plan of the machine; Fig. 2, a side elevation thereof, with the nearest wheel removed.

*a* denotes the frame or body of the carriage, hung upon an axle, *b*, which is mounted upon draft-wheels *c*. The front end of the carriage is supported upon the shaft of a guide-wheel, *d*, the three wheels keeping the carriage-frame in a fixed position or elevation above the surface of the ground. The pole or shafts are attached in any suitable manner to the forward end of the frame *a*. The front end of this frame supports a long bolt or shaft, *e*, which serves as a hinge to a series of beams, *f*, turning thereon, the rear end of each beam supporting a standard, *h*, to the bottom of which is fixed the share *g*, the standard being preferably fastened to its beam by a bolt passing through a slot in the standard and into the beam, as seen in Fig. 2, the bolt and slot enabling the angle of the share to be adjusted, as will be readily understood. From the front end of each beam a handle, *i*, may extend up through a slot in the frame *a*, a spring-latch being so applied to the top of the frame that each handle, when the share is lifted thereby to the position shown by dotted lines in Fig. 2, can be fastened in such position. Long arms *k* are hung upon the ends of the axle *b* and project rearward therefrom, a drum, *l*, being hung upon the outer ends thereof, said drum being provided with a series of harrow-teeth, *m*, projecting therefrom, as seen in the drawings. A band, *n*, passes around the drum *l* and a pulley, *o*, connected with the adjacent wheel *c*, so that rotation of the drum is effected by the movement of the carriage. The pulley *o* connects with the hub of the wheel *c* by a clutch apparatus, so that by movement of a clutch-lever, *p*, the pulley can be connected with or disconnected from the wheel, so as to impart rotary motion to the teeth *m* or stop such rotation, as circumstances may require. A cord or chain, *q*, is fastened at one end to a bar, *r*, connecting the two arms *k*, and, passing over a sheave, *s*, is fastened at its opposite end to a hand lever, *t*. When the machine is moving over ground not to be operated upon, the pulley *o* is unclutched from the wheel *c*, and the drum *l* is elevated by the lever *t*, a spring-latch, *u*, holding the drum in elevated position, or so that its teeth do not come into contact with the ground. The shares *g* may also be raised by the levers *f* and fastened in the position denoted by the dotted lines in Fig. 2. Now, when it is desirable to operate with the shares, it is only necessary to unlatch the beams *f* and let the shares *g* down upon the surface of the ground, the angle of presentation of each share causing it to enter the soil (as the carriage moves forward) until it assumes a horizontal or nearly horizontal position, as seen in Fig. 2, the depth to which the share penetrates being, as before observed, determined by its angular position relative to the beam, or the depth to which it must enter to bring it into a horizontal plane. Each share is, therefore, self-actuating in this respect while in operation, and the machine works with much greater freedom and effectiveness than where the share is fixed relatively to the carriage or wheeled frame upon which it is mounted. To bring the harrow into operation, also, the lever *t* is unlatched, when the weight of the drum will cause the teeth *m* to penetrate sufficiently into the soil plowed up by the shares to disintegrate or pulverize it, the contact of the successive series of the rotating teeth preventing too deep penetration.

We claim—

1. In combination with a wheeled frame or carriage-body, a share or shares secured to a beam or beams, so arranged as to swing vertically, the share or shares being thus left free to move in vertical directions while in operation, and so as to be self-adjusting as to depth of penetration into the soil, each share also having provision for angular adjustment relatively to its beam, substantially as shown and described.

2. In combination with the shares *g*, the rotary harrow arranged to swing vertically, substantially as set forth.

EDMUND D. REYNOLDS.
O. BRADFORD REYNOLDS.

Witnesses:
JNO. WHITE,
DANIEL D. TILDEN.